Dec. 10, 1963  R. A. BRIGHT  3,113,346
NOZZLE ARRANGEMENT FOR HOT RUNNER PLASTIC MOLDS
Filed March 22, 1962
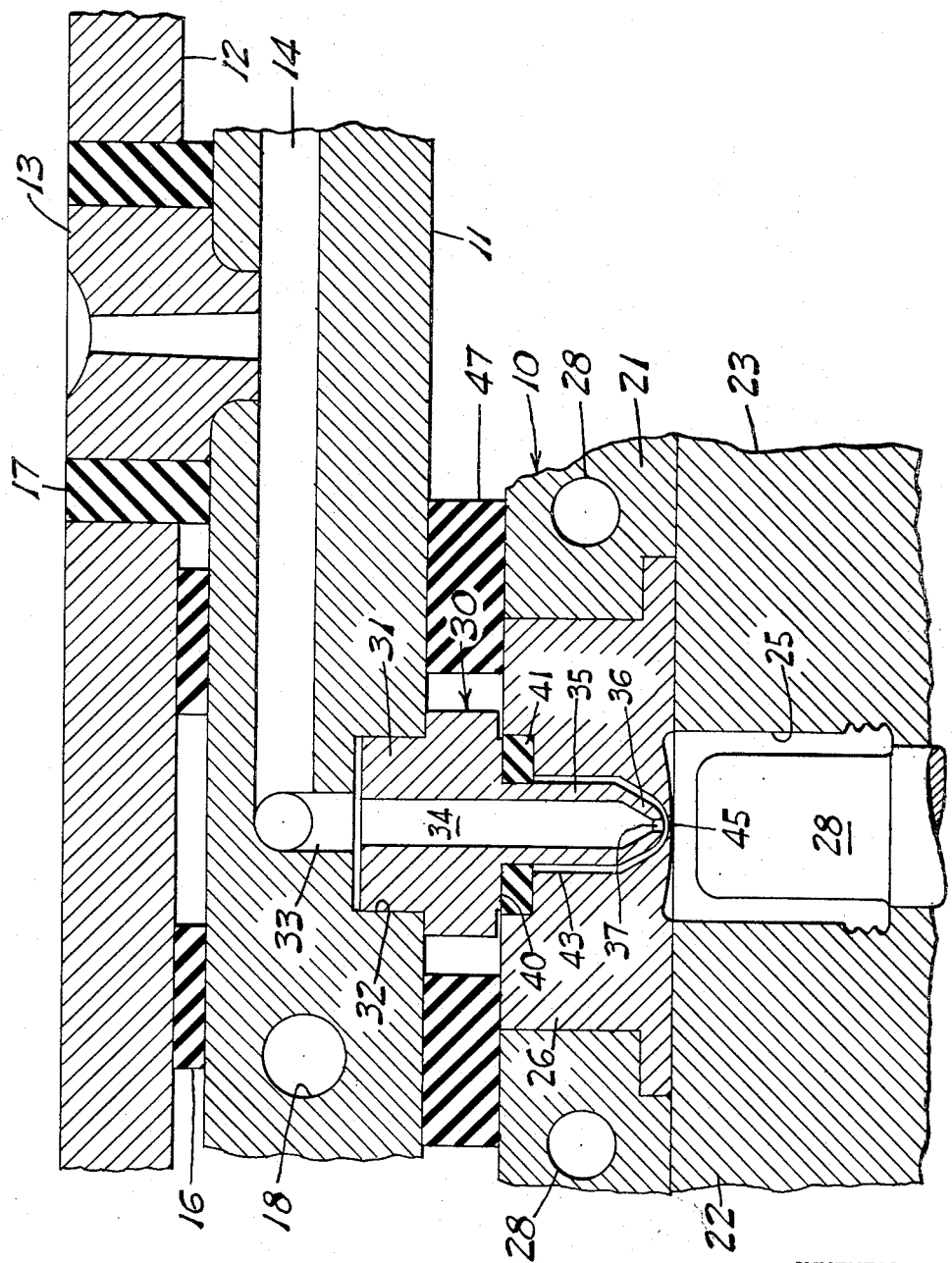
INVENTOR.
ROY A. BRIGHT
BY
Christel & Bean
ATTORNEYS

United States Patent Office 3,113,346
Patented Dec. 10, 1963

3,113,346
NOZZLE ARRANGEMENT FOR HOT RUNNER PLASTIC MOLDS
Roy A. Bright, Kenmore, N.Y., assignor to Du Bois Plastic Products, Inc., Buffalo, N.Y.
Filed Mar. 22, 1962, Ser. No. 181,703
6 Claims. (Cl. 18—30)

This invention relates to apparatus for molding thermoplastic materials and more particularly to injection apparatus for supplying plastic material to mold cavities.

The present invention relates more particularly to so-called hot runner mold apparatus which produces molded plastic articles without the usual sprue or gate formations which come from the mold attached to the articles in other conventional plastic molding procedures and apparatus.

In supplying plastic material to mold cavities by injection thereof, and particularly in prior art hot runner mold constructions, serious problems of plastic leakage are present. The plastic is injected under very high pressure and the prevention of leakage or seepage of plastic is a serious problem since such seepage or leakage fouls the apparatus, produces abnormal conditions, and may result in jamming of the equipment, undue stresses and strains and other objectionable conditions.

The present invention is concerned particularly with the provision of an injection nozzle arrangement which avoids seepage or leakage in a novel manner, particularly with respect to certain critical abutting surfaces which are necessarily present at the interfaces of the plastic feeding portion of the mold structure which is normally heated and the plastic molding portion which is normally cooled. The temperature differences which prevail between these two portions of the molding apparatus aggravates and complicates the problem of leakage prevention.

The novel injection nozzle arrangement of the present invention employs the injecting pressure of the plastic material itself to urge these abutting faces into engagement, the arrangement being such that the total area against which the plastic material acts to force the surfaces into abutment is greater than the area of the abutting surfaces. Thus at any given internal plastic pressure the force acting to hold the surfaces in abutment is greater than any force which the plastic can generate by leakage to urge the abutting faces apart.

The accompanying drawing and the following specification set forth a specific embodiment of the injection nozzle principles of the present invention but it is to be understood that this embodiment is by way of example only and that the scope of the invention is not limited thereto nor otherwise than as defined in the appended claims. Various modifications may be made in the specific arrangement thus illustrated and described. Various objects and advantages of the present invention will occur to those skilled in the injection molding art from a study of the accompanying drawing and the following detailed description.

The single FIGURE of the drawing is a cross-sectional view through a portion of an injection molding apparatus comprising the usual clamp plate, the plastic distributing manifold plate and the entry portion of the plastic mold proper, the same being constructed in accordance with one form of the present invention.

While the instant drawing shows only the plastic material distribution and injection portions of a plastic molding apparatus, the same will be fully expository of the principles of the present invention and will be clearly understood by those familiar with the plastic molding art.

In the drawing, the numeral 10 designates generally the mold itself, the numeral 11 designates a manifold plate which distributes plastic material to the several cavities of the mold 10, and the numeral 12 designates a clamp plate which mounts the manifold plate and attaches to the platen of the press in which the present apparatus is conventionally used, such presses being well known in this art. The manifold 11 and clamp plate 12 are relatively fixed and immovable in the usual operation of the apparatus and a sprue bushing 13 communicating with the plastic distribution passage 14 in manifold 11 receives plastic material, by way of example, from a plunger type injector associated with a conventional plasticizer.

While the manifold 11 and clamp 12 are relatively immovable they are heat insulated from each other as by an air space and spacers 16 of insulating material and an insulating bushing 17 insulates the sprue bushing 13 from clamp plate 12. The manifold 11 becomes heated by contact with the hot plastic material and is usually additionally heated as by electric cartridge heaters 18 so as to maintain the plastic at proper working temperature and it is desired that this heat be generally retained in the manifold 11 and not dissipated to the clamp plate 12 or other adjoining structure. Heat exchange fluids may be employed in place of the cartridge heaters when and if desired.

It is to be understood that plastic passage 14 of the manifold plate may lead to a considerable number of mold cavities and a number of other passages similar to the passage 14 may extend from sprue bushing 13. For simplicity and for the purpose of clarity of understanding, the present drawing shows only a single mold cavity and a single injection nozzle for such cavity, it being understood that in the preferred form of the invention, a number of injection nozzles leading to a corresponding number of mold cavities will usually be employed.

The mold means designated generally by the numeral 10 comprises a number of components some of which are movable, mainly for the purpose of removing molded articles from the mold cavities. In the present instance a relatively stationary cavity base plate is designated 21 and the numerals 22 and 23 designate movable mold parts which are known in the art as cavity splits. The cavity in the drawing is designated 25 and it will be noted that a small portion thereof is formed in the radial face of a bushing 26 which fits into cavity base plate 10 and the remaining surfaces of the mold cavity 25 are formed jointly in the two cavity splits 22 and 23, the same having a parting line or plane extending through the center of bushing 26 and the mold cavity 25.

The interior of the mold cavity surface is formed by a plunger 28 which withdraws from the mold cavity in the opening operation of the mold. In such opening operation the cavity splits 22 and 23 move apart and away from the base plate 21, that is downwardly as viewed in the drawing. As indicated earlier herein, the mold structure per se is entirely conventional apart from the hot runner nozzle structure and many other types and arrangements of molds and mold parts may be employed.

It is desired that the mold 10 be maintained at a relatively much lower temperature than the manifold 11 to hasten the cooling of the injected material in the mold and thus shorten the required time cycle. To this end the mold 10 may be artificially cooled in various ways and in the drawing the numeral 28 designates water circulating passages in cavity base plate 10. It will be noted that bushing 26 is in close fitting contact with cavity base plate 10 and therefore will likewise be maintained relatively cool. Additional cooling passages may be formed in other parts of the mold structure as required.

Reference will now be had specifically to the hot runner injection bushing structure and arrangement of the present invention. The bushing itself is designated generally by the numeral 30 and comprises a reduced end portion 31 which fits closely within a counterbore 32 in manifold 11 in axial alignment with a plastic passage 33 leading from plastic distributing passage 14. A plastic passage 34 extends axially through bushing 30.

The opposite end of bushing 30 is formed with a tubular portion 35 which terminates in a converging tapering portion 36 having a central aperture 37 in the end thereof which comprises the terminus of passage 34. Bushing 30 has a boss formation 40 which is preferably but not necessarily of less diameter than the end portion 31, which boss seats against an insulating washer or annulus 41 in the bushing 26 of cavity base plate 31, the annulus 41 comprising in effect a part of the general structure of the mold 10.

Tubular portion 35 and its tapering portion 36 extend into an axial opening 43 in bushing 26, the opening being sufficiently larger than the tubular portion 35 and tapering portion 36 so that the latter are spaced from the opening in the bushing at all points. A relatively small plastic passage 45 is provided in bushing 26 in axial alignment with the aperture 37 of nozzle 30 and leads to cavity 25.

It will be noted from the foregoing that nozzle 30 and its tubular extending portions 35, 36 form in effect a part of manifold 11 and all parts of the nozzle are insulated from the mold per se either by insulating washer 41 or by the spacing of the nozzle portions 35 and 36 from the walls of opening 43. The space between this nozzle portion and the walls of opening 43 will become filled with plastic material in normal operation of the apparatus and this plastic material is itself a good heat insulator. Manifold 11 and the cavity base plate 21 of mold 10 are normally fixed and immovable relative to each other but are separated by air space and by insulating material as at 47 in the drawing.

The annular area of the end radial face of the reduced portion 31 of nozzle 30 is of substantially greater area than the annular seating area of boss formation 40 against the insulating annulus 41 and accordingly the pressure of plastic against the end face of portion 31 is greater than any unseating pressure which can develop between the parts 40 and 41 under any conditions. In fact the more extreme the internal plastic pressure, the tighter the seal between the manifold plate 11 and the mold 10 at the sealing face between those parts established by parts 40 and 41.

The nozzle member 30 is preferably of bronze which has a higher coefficient of expansion than steel and the reduced portion 31 of the nozzle 30 is initially fitted very closely into counterbore 32.

I claim:

1. Injection molding apparatus comprising mold means and adjacent plastic feeding passage means, said two means being spaced to avoid heat conduction therebetween, said mold means having a mold cavity therein and an opening in the surface thereof facing said passage means and terminating in a reduced orifice opening into said cavity, said passage means having a plastic passage therein terminating in a counterbore in the face of said passage means facing said mold means and in alignment with said mold means surface opening, an injection nozzle having an end thereof fitting closely in said counterbore but having its end face spaced from the inner surface of said counterbore to provide a pressure space, said nozzle having a reduced nozzle portion at its other end projecting into said mold means opening but spaced therefrom, a plastic passage extending axially through said nozzle and terminating at the end of said nozzle portion in a reduced orifice in alignment with said mold means orifice, said nozzle having an annular ledge surrounding said reduced nozzle portion and seating against said mold means, the area of the annular end of said nozzle in said counterbore being substantially greater than the area of the seating portion of said annular ledge whereby the plastic pressure force tending to seat said nozzle against said mold means exceeds the displacing force of plastic which may leak between said ledge seating portion and said mold means.

2. Injection molding apparatus comprising mold means and adjacent plastic feeding passage means, said two means being spaced to avoid heat conduction therebetween, said mold means having a mold cavity therein and an opening in the surface thereof facing said passage means and terminating in a reduced orifice opening into said cavity, said mold means including an annular heat insulating member surrounding said opening, said passage means having a plastic passage therein terminating in a counterbore in the face of said passage means facing said mold means and in alignment with said mold means surface opening, an injection nozzle having an end thereof fitting closely in said counterbore but having its end face spaced from the inner surface of said counterbore to provide a pressure space, said nozzle having a reduced nozzle portion at its other end projecting into said mold means opening but spaced therefrom, a plastic passage extending axially through said nozzle and terminating at the end of said nozzle portion in a reduced orifice in alignment with said mold means orifice, said nozzle having an annular ledge surrounding said reduced nozzle portion and seating against said annular heat insulating member, the area of the annular end of said nozzle in said counterbore being substantially greater than the area of the seating portion of said annular ledge against said heat insulating member whereby the plastic pressure force tending to seat said nozzle against said mold means exceeds the displacing force of plastic which may leak between said ledge seating portion and said mold means.

3. Injection molding apparatus comprising mold means and adjacent plastic feeding passage means, said two means being spaced to avoid heat conduction therebetween, said mold means having a mold cavity therein and a plastic passage into said cavity from the mold means surface adjacent to said passage means, said passage means having a plastic passage therein terminating in a counterbore in the face of said passage means adjacent to said mold means and in alignment with said mold means plastic passage, an injection nozzle having an end thereof fitting closely in said counterbore but having its end face spaced from the inner surface of said counterbore to provide a pressure space, said nozzle having a nozzle portion at its other end directed toward said mold means plastic passage but out of contact therewith, a plastic passage extending axially through said nozzle and terminating at the end of said nozzle portion in a reduced orifice in alignment with said mold means plastic passage, said nozzle having an annular ledge surrounding said nozzle portion and seating against said mold means, the area of the annular end of said nozzle in said counterbore being substantially greater than the area of the seating portion of said annular ledge whereby the plastic pressure force tending to seat said nozzle against said mold means exceeds the displacing force of plastic which may leak between said ledge seating portion and said mold means.

4. Injection molding apparatus comprising mold means and adjacent plastic feeding passage means, said two means being spaced to avoid heat conduction therebetween, said mold means having a mold cavity therein and a plastic passage into said cavity from the surface of said mold means adjacent to said passage means, said mold means including an annular heat insulating member surrounding said passage at said surface, said passage means having a plastic passage therein terminating in a counterbore in the face of said passage means adjacent to said mold means and in alignment with said mold means plastic passage, an injection nozzle having an end thereof fitting closely in said counterbore but having its end face spaced from the inner surface of said counterbore to provide a pressure space, said nozzle having a nozzle portion at its other end directed toward said mold means plastic passage but out of contact therewith, a plastic passage extending axially through said nozzle and terminating at the end of said nozzle portion in a reduced orifice in alignment with said mold means plastic passage, said nozzle having an annular ledge surrounding said nozzle portion and seating against said annular heat insulating member, the area of the annular end of said nozzle in said counterbore being substantially greater than the area of the seating portion of said annular ledge against said heat insulating member whereby the plastic pressure force tending to seat said nozzle against said mold means exceeds the displacing force of plastic which may leak between said ledge seating portion and said mold means.

5. Injection molding apparatus comprising mold means and adjacent plastic feeding passage means, said two means being spaced to avoid heat conduction therebetween, said mold means having a mold cavity therein and an opening into said cavity from the surface thereof adjacent to said passage means, said passage means having a plastic passage therein terminating in a counterbore in the face of said passage means adjacent to said mold means and in alignment with said mold means surface opening, an annular injection member having an end thereof fitting closely in said counterbore but having its end face spaced from the inner surface of said counterbore to provide a pressure space, the other end of said injection member being directed toward said mold means opening but out of contact therewith, said injection member having an annular ledge seating against said mold means, the area of the annular end of said nozzle in said counterbore being substantially greater than the area of the seating portion of said annular ledge whereby the plastic pressure force tending to seat said nozzle against said mold means exceeds the displacing force of plastic which may leak between said ledge seating portion and said mold means.

6. Injection molding apparatus comprising mold means and adjacent plastic feeding passage means, said two means being spaced to avoid heat conduction therebetween, said mold means having a mold cavity therein and an opening into said cavity from the surface thereof adjacent to said passage means, said mold means including an annular heat insulating member surrounding said opening, said passage means having a plastic passage therein terminating in a counterbore in the face of said passage means adjacent to said mold means and in alignment with said mold means surface opening, an annular injection member having an end thereof fitting closely in said counterbore but having its end face spaced from the inner surface of said counterbore to provide a pressure space, the other end of said injection member being directed toward said mold means opening but out of contact therewith, said injection member having an annular ledge seating against said annular heat insulating member, the area of the annular end of said nozzle in said counterbore being substantially greater than the area of the seating portion of said annular ledge against said heat insulating member whereby the plastic pressure force tending to seat said nozzle against said mold means exceeds the displacing force of plastic which may leak between said ledge seating portion and said mold means.

References Cited in the file of this patent
UNITED STATES PATENTS

| | | |
|---|---|---|
| 2,461,282 | Jobst | Feb. 8, 1949 |
| 2,814,831 | McKee | Dec. 3, 1957 |
| 2,928,125 | Smucker et al. | Mar. 15, 1960 |
| 3,052,925 | Bronnenkant et al. | Sept. 11, 1962 |